Patented Aug. 10, 1948

UNITED STATES PATENT OFFICE 2,446,570

ETHERS OF 1-(3,4-DIHYDROXY-CYCLO-HEXYL)-1,2-DIHYDROXYBUTANONE

Joseph E. Bludworth, Corpus Christi, Tex., and Donald P. Easter, Washington, D. C., assignors to Celanese Corporation of America, a corporation of Delaware No Drawing. Original application September 19, 1944, Serial No. 554,858. Divided and this application April 25, 1946, Serial No. 664,980

3 Claims. (Cl. 260—586)

This invention relates to novel organic compounds and relates more particularly to the ethers of 1-(3,4-dihydroxy-cyclohexyl)-1,2-dihydroxybutanone,

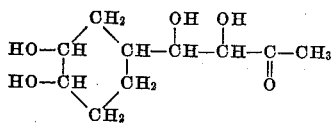

having the following formula

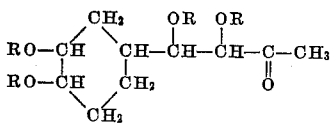

wherein R is an alkyl, cycloalkyl, aryl and aralkyl radical.

This application is a division of our application S. No. 554,858, filed September 19, 1944, which issued as Patent No. 2,434,981 on January 27, 1948.

An object of our invention is the preparation of certain novel ethers of 1-(3,4-dihydroxycyclohexyl)-1,2-dihydroxybutanone.

Other objects of this invention will appear from the following detail description.

In accordance with the Diels-Alder reaction, the condensation of acrolein with butadiene yields Δ³-tetrahydrobenzaldehyde. On reacting this aldehyde with acetone in the presence of potassium hydroxide, β-(Δ³-tetrahydrophenyl)-vinyl methyl ketone is formed,

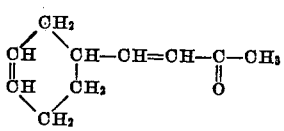

which on oxidation yields the higher molecular weight polyhydric alcohol 1-(3,4-dihydroxycyclohexyl)-1,2-dihydroxybutanone.

When etherified with suitable etherifying agents, this polyhydroxy compound yields novel ethers which are valuable for use as plasticizers, as intermediates in the preparation of higher molecular weight compounds and for other industrial applications. As examples of ethers which may be formed there may be mentioned the methyl, ethyl, propyl, butyl, lauryl, and benzyl ethers and the ethers of such polyhydric alcohols as, for example, ethylene glycol, propylene glycol and glycerol.

In order further to illustrate our invention, but without being limited thereto, the following example is given:

Example

To a solution of 218 parts by weight of 1-(3,4-dihydroxycyclohexyl)-1,2-dihydroxybutanone in 350 parts absolute diethyl ether is added in small pieces 92 parts metallic sodium at such a rate as to keep the ether slowly refluxing. When the addition of sodium is complete, 252 parts of dimethyl sulfate are added with stirring, keeping the ether gently boiling. Cooling may be applied if the reaction tends to become violent during the initial stages of the addition. After the dimethyl sulfate has been added, the mixture is stirred and refluxed for one hour. The sodium sulfate is filtered out and the ether evaporated from the filtrate. The residue, 1-(3,4-dimethoxycyclohexyl)-1,2-dimethoxybutanone, can be purified by recrystallization from suitable organic solvents.

This procedure, yielding the completely methylated derivative, can be modified by reducing the amount of dimethyl sulfate employed to yield, on reaction, partially methylated products which contain unreacted hydroxyl groups.

It is to be understood that the foregoing detailed description is given merely by way of illustration and that many variations may be made therein without departing from the spirit of our invention.

Having described our invention, what we desire to secure by Letters Patent is:

1. Compounds of the following general formula

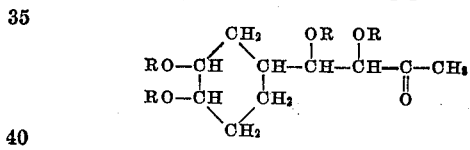

wherein R is a member of the group consisting of alkyl and aralkyl radicals.

2. 1 - (3,4 - dimethoxycyclohexyl) - 1,2 - dimethoxybutanone.

3. Process for the production of 1-(3,4-dimethoxycyclohexyl) - 1,2 - dimethoxybutanone, which comprises methylating 1-(3,4-dihydroxycyclohexyl)-1,2-dihydroxybutanone with dimethyl sulfate in a medium comprising anhydrous diethyl ether and metallic sodium.

JOSEPH E. BLUDWORTH.
DONALD P. EASTER.